United States Patent [19]

Nakano

[11] Patent Number: 4,771,604
[45] Date of Patent: Sep. 20, 1988

[54] PNEUMATIC BRAKE BOOSTER WITH RELAY VALVE IN THE BOOSTER-CYLINDER-END

[75] Inventor: Asao Nakano, Kanagawa, Japan

[73] Assignee: Nippon Air Brake Co., Ltd., Japan

[21] Appl. No.: 634,624

[22] Filed: Jul. 26, 1984

[30] Foreign Application Priority Data

Jul. 30, 1983 [JP] Japan .................. 58-119213[U]
Oct. 13, 1983 [JP] Japan .................. 58-191208

[51] Int. Cl.⁴ .................. B60T 17/22; F15B 15/18; F16D 63/00; F16K 31/12
[52] U.S. Cl. .................. 60/534; 60/578; 60/586; 60/593; 92/5 R; 188/1.11; 137/627.5; 91/461
[58] Field of Search .................. 60/547.1, 548, 551, 60/556, 574, 578, 588, 593, 586; 92/5 R; 188/1.11; 137/627.5; 91/461

[56] References Cited

U.S. PATENT DOCUMENTS

| 2,746,255 | 5/1956 | Fitch et al. | 60/548 X |
| 2,900,962 | 8/1959 | Ingres | 60/547.1 X |
| 2,957,454 | 10/1960 | Stelzer | 60/551 X |
| 3,712,340 | 1/1973 | Deem | 251/26 X |
| 4,316,529 | 2/1982 | Yanagawa et al. | 60/593 X |
| 4,522,031 | 6/1985 | Kytta et al. | 60/547.1 |

FOREIGN PATENT DOCUMENTS

| 1057880 | 5/1959 | Fed. Rep. of Germany | 60/547.1 |
| 1576178 | 7/1969 | Fed. Rep. of Germany | 60/547.1 |
| 1555538 | 3/1970 | Fed. Rep. of Germany | 60/547.1 |

Primary Examiner—Robert E. Garrett
Assistant Examiner—George Kapsalas
Attorney, Agent, or Firm—Jones, Day, Reavis & Pogue

[57] ABSTRACT

A pneumatic-hydraulic booster for vehicles includes a master cylinder part; a pneumatic cylinder part combined with the master cylinder part including a power piston slidably fitted to a cylindrical casing and an output rod fixed to the power piston, extending to the master cylinder part; a partition wall body fitted to the cylindrical casing; and a relay valve part being arranged at the opposite side of the partition wall body to the power piston in the cylindrical casing. The relay valve supplies compressed air into an air pressure chamber formed between the partition wall body and the power piston and discharges the compressed air from the air pressure chamber to the atmosphere. When compressed air is supplied into the air pressure chamber through the relay valve part, the power piston and the output rod are moved forwards to generate hydraulic pressure in the master cylinder part. The hydraulic pressure is applied to a wheel cylinder.

19 Claims, 5 Drawing Sheets

PNEUMATIC BRAKE BOOSTER WITH RELAY VALVE IN THE BOOSTER-CYLINDER-END

BACKGROUND OF THE INVENTION

1. Field of the Invention

This invention relates to a pneumatic-hydraulic brake booster or air over hydraulic brake booster for a vehicle.

2. Brief Description of the Prior Art

In a conventional pneumatic-hydraulic brake booster, an internal space of a cylindrical casing is divided to two chambers by a power piston which is slidably fitted to the cylindrical casing. In operation, compressed air is supplied to the one chamber. An output rod is fixed to the power piston, and it extends across the other chamber into a hydraulic cylinder body of a master cylinder part.

The compressed air is supplied to the one chamber directly from a brake valve or through a relay valve from the brake valve. In the former case, only one conduit is connected between the brake booster and the brake valve. The brake system is simple. However, in the latter case, one conduit is connected between the brake valve and the relay valve fixed to a part of the chassis of the vehicle, and another conduit should be connected between the relay valve and the brake booster. The brake system is so complicated. More parts are necessary. Manufacturing efficiency or productivity is low.

When the distance between the brake valve and the brake booster is long, the braking operation retards behind the tread of the brake pedal in the booster without relay valve. The retard can be reduced with the relay valve arranged near the brake booster. However, the conventional brake booster has the above described defects.

SUMMARY OF THE INVENTION

Accordingly, it is an object of this invention to provide a pneumatic-hydraulic brake booster which can simplify the whole braking system.

Another object of this invention is to provide a pneumatic-hydraulic brake booster which can improve the manufacturing efficiency or productivity.

A further object of this invention is to provide a pneumatic-hydraulic brake booster which is compact in construction.

In accordance with an aspect of this invention, a pneumatic-hydraulic booster includes a master cylinder part; a pneumatic cylinder part combined with the master cylinder part, including a power piston slidably fitted to a cylindrical casing and an output rod fix to the power piston, extending to the master cylinder part; a partition wall body fitted to the cylindrical casing; and a relay valve part being arranged at the opposite side of the partition wall body to the power piston in the cylindrical casing. The relay valve supplies compressed air into an air pressure chamber formed between the partition wall body and the power piston and discharges the compressed air from the air pressure chamber to the atmosphere. When compressed air is supplied into the air pressure chamber through the relay valve part, the power piston and the output rod are moved forwards to generate hydraulic pressure in the master cylinder part. The hydraulic pressure is applied to a wheel cylinder.

The foregoing and other objects, features, and advantages of the present invention will be more readily understood upon consideration of the following detailed description of the preferred embodiment of the invention, taken in conjunction with the accompanying drawings.

DETAILED DESCRIPTION OF THE PREFERRED EMBODIMENTS

First, there will be described one example of the braking system in which pneumatic-hydraulic boosters according to one embodiment of this invention are employed.

Figure 1:
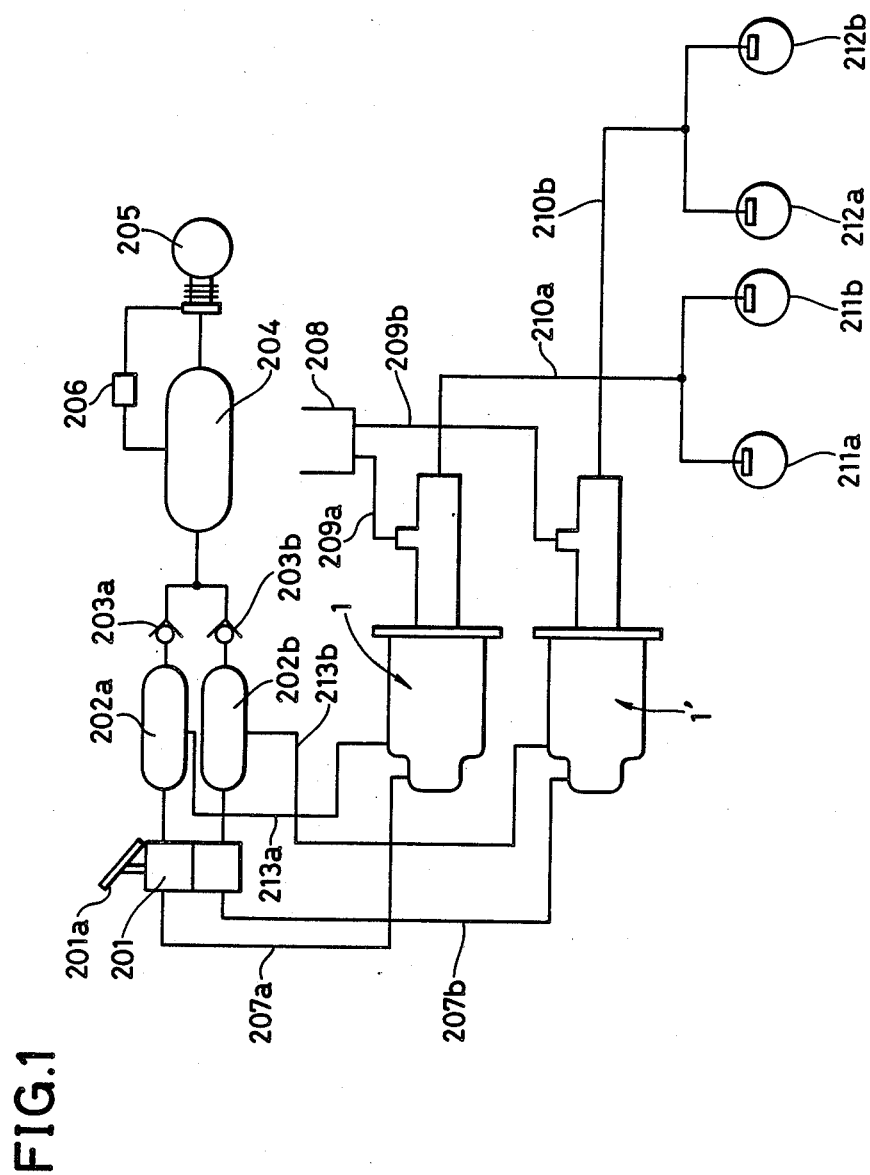
FIG. 1 is a diagramatic view of a braking system in which pneumatic-hydraulic boosters according to one embodiment of this invention are employed.

In FIG. 1, two service ports of a dual brake valve 201 are connected through conduits 207a and 207b to pneumatic-hydraulic boosters 1 and 1' according to one embodiment of this invention, respectively. The boosters 1 and 1' to be hereinafter described in detail are equal to each other in construction and operation. Two air supply ports of the dual brake valve 201 are connected to air reservoir tanks 202a and 202b which are connected through check valves 203a and 203b and a main air reservoir tank 204 to an air compressor 205 respectively.

The check valves 203a and 203b permit air to flow only in the direction towards the air reservoir tanks 202a and 202b from the main tank 204. Further, a pressure governer 206 is connected between the air compressor 205 and the main air reservoir tank 204. An oil reservoir 208 is connected through conduits 209a, 209b to master cylinder parts of the boosters 1 and 1', respectively. When a driver of the vehicle provided with the braking system of FIG. 1 treads a brake pedal 201a of the dual brake valve 201, compressed air is supplied through relay valve parts to be hereinafter described in detail, of the boosters 1 and 1', and pressurized brake oil from the boosters 1 and 1' is supplied through conduits 210a and 210b into wheel cylinders of front wheels 211a, 211b and rear wheels 212a and 212b, for braking them respectively.

Next, only the booster 1 will be described in detail, since the boosters 1 and 1' are equal to each other in construction and operation.

Figure 2:
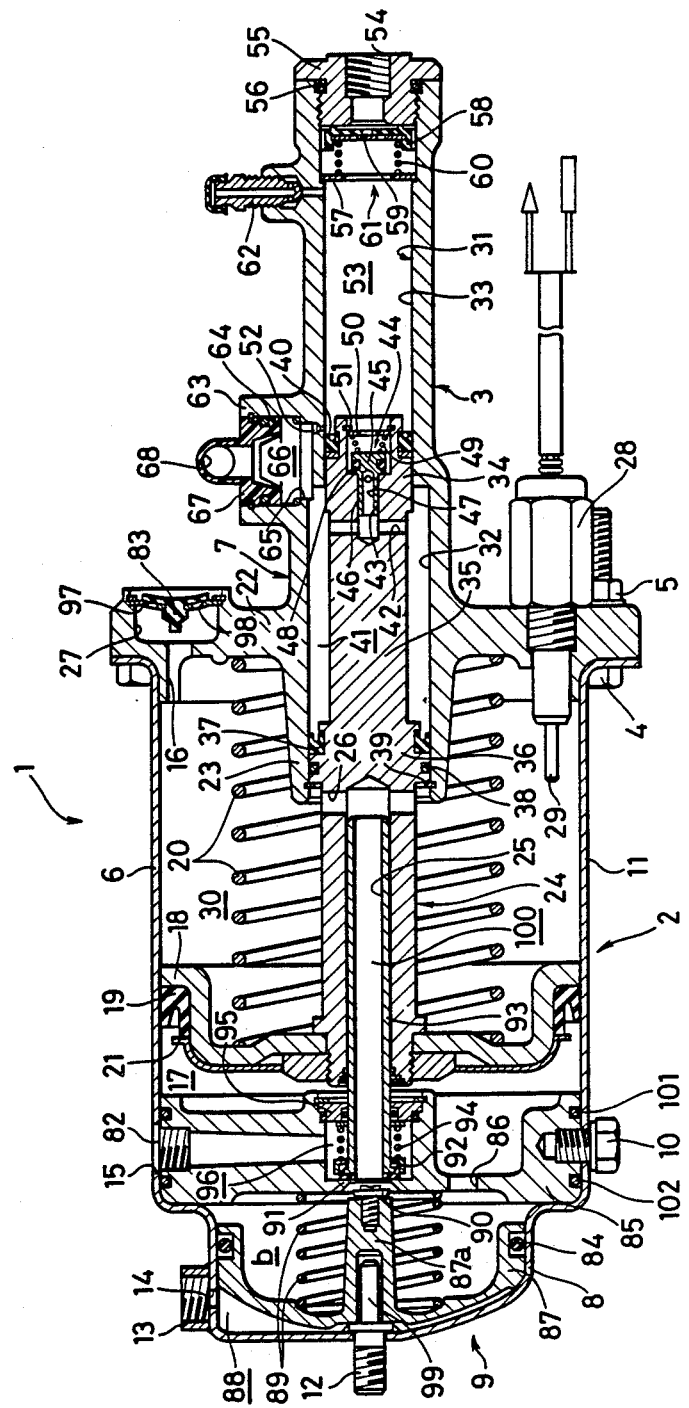
FIG. 2 is a cross-sectional view of the pneumatic-hydraulic booster according to the one embodiment of this invention.

Referring to FIG. 2, the pneumatic-hydraulic booster 1 consists of an air cylinder part 2, a master cylinder part 3 and a relay valve part 9. The air cylinder part 2 and the relay valve part 9 are disposed in a cylindrical casing 6 which is combined with a flange portion 22 of a master cylinder body 7 at its flange portion by plural bolts 4 and nuts 5. The cylindrical casing 6 consists of a main portion 11 and a leftwardly projecting portion 8. A screw 12 for fixing to the chassis of the vehicle is air-tightly fixed to the projecting portion 8 by a welding operation such as projection welding. A connecting member 13 is fixed to an upper side of the projecting portion 8. An opening 14 is formed in the upper side of the projecting portion 8, in alignment with the connecting member 13. The conduit 207a shown in FIG. 1 is connected to the connecting member 13.

A power piston 18 provided with a seal member 19 of rubber is slidably disposed in the main portion 11 of the casing 6. A connecting rod 24 as an output rod is fixed to the power piston 18, and it is slidably inserted into the master cylinder body 7 of the master cylinder part 3. A holding member 21 is fixed to the power piston 18 in order to prevent the seal member 19 from falling out. The power piston 18 is urged leftwards by a return spring 20 which extends between the power piston 18 and the flange portion 22 of the master cylinder body 7.

An internal space for defining the air cylinder part 2 is formed by the main portion 11 of the casing 6, the flange portion 22 of the master cylinder body 7, a projecting portion 23 thereof, and a relay valve main body 85 to be hereinafter described in detail, and it is divided into an air pressure chamber 17 and an atmospheric chamber 30 by the power piston 18. The atmospheric chamber 30 communicates through a path 16 with an exhaust chamber 27 formed in the upper side of the flange portion 22. A stroke switch 28 is screwed to the lower side of the flange portion 22, and its actuating rod 29 faces the lower portion of the power piston 18, spaced from each other by a predetermined length.

In the master cylinder part 3, a stepped hole 31 is formed in the master cylinder body 7, and it consists of a larger diameter hole portion 32 and a smaller diameter hole portion 33. The connecting rod 24 functions also as a piston in the master cylinder part 3. A top end portion 24 of the connecting rod 34 is slidably fitted to the smaller diameter hole portion 33, a smaller diameter portion 35 thereof extends along the larger diameter hole portion 32, and a larger diameter portion 36 thereof is slidably fitted to the larger diameter hole portion 32. The top end portion 34 of the connecting rod 34 is provided with a seal member 40 of rubber. The larger diameter portion 36 thereof are provided with seal members 37 and 38 of rubber.

A stopper ring 39 is fixed to the end of the projecting portion 23 of the master cylinder body 7, and contracts the larger diameter portion 36 of the connecting rod 24. Thus, the original position of the connecting rod 24 or power piston 18, as shown in FIG. 2 is determined by the stopper ring 39.

A radial through hole 42 is formed in the smaller diameter portion 35 of the connecting rod 24, an axial stepped hole 43 in communication with the radial through hole 42 is formed in the top end portion 34 of the connecting rod 24. A valve device 44 is disposed in the axial stepped hole 43. A head portion of a valve member 45 provided with valve rubber 48 is disposed in a larger diameter portion of the stepped hole 43, and a shank portion 46 thereof is slidably fitted to a smaller-diameter portion of the stepped hole 43. A valve spring 49 extends between the head portion of the valve member 45 and a ring 50 which is prevented from falling out by a stopper ring 51 fixed to the top end of the connecting rod 24, and it urges the head portion of the valve member 45 leftwards, contacting the latter with the step portion of the stepped hole 43 in the shown non-operated condition. Thus, the valve device 44 is closed. When the valve device 44 is opened by brake oil pressure, as described hereinafter, an auxiliary hydraulic pressure chamber 41 formed around the smaller diameter portion 35 of the connecting rod 24 is made to communicate with a main hydraulic pressure chamber 53 partitioned from the auxiliary hydraulic pressure chamber 41 by the top end portion 34 of the connecting rod 24. Brake oil flows through the radial through hole 42, an inner axial hole 47 of the shank portion 46 of the valve member 44, a radial hole thereof and the larger diameter hole portion of the stepped hole 43 into the main hydraulic pressure chamber 53.

A plug member 55 provided with a seal member 56 of rubber is screwed to a front end portion of the master cylinder body 7. A central outlet 54 of the plug 55 is connected through the conduit 210a shown in FIG. 1 to the wheel cylinders of the front wheels 211a and 211b. A residue pressure valve 61 is arranged adjacent to the plug member 55 in the master cylinder body 7, and it consists of a spring receiving ring 57, a valve rubber 58, a spring receiving disc 59 attached to the valve rubber 58, a valve spring 60 extended between the spring receiving ring 57 and the spring receiving disc 59. A central opening in alignment with the central outlet 54 is formed in the valve rubber 58. Plural openings are formed in the spring receiving disc 59 eccentrically with the central opening of the valve rubber 58. A bleeder device 62 is screwed to the master cylinder body 7 adjacent to the residue pressure valve 61.

A boss 63 is formed in the upper side of the intermediate portion of the master cylinder body 7. A multiple valve apparatus 66 is disposed in a hole 64 of the boss 63. A connecting member 67 is fitted to the boss 63 above the multiple valve apparatus 66. An inside hole 68 of the connecting member 67 is connected through the conduit 209a (FIG. 1) to the oil reservoir 208.

Figure 3:
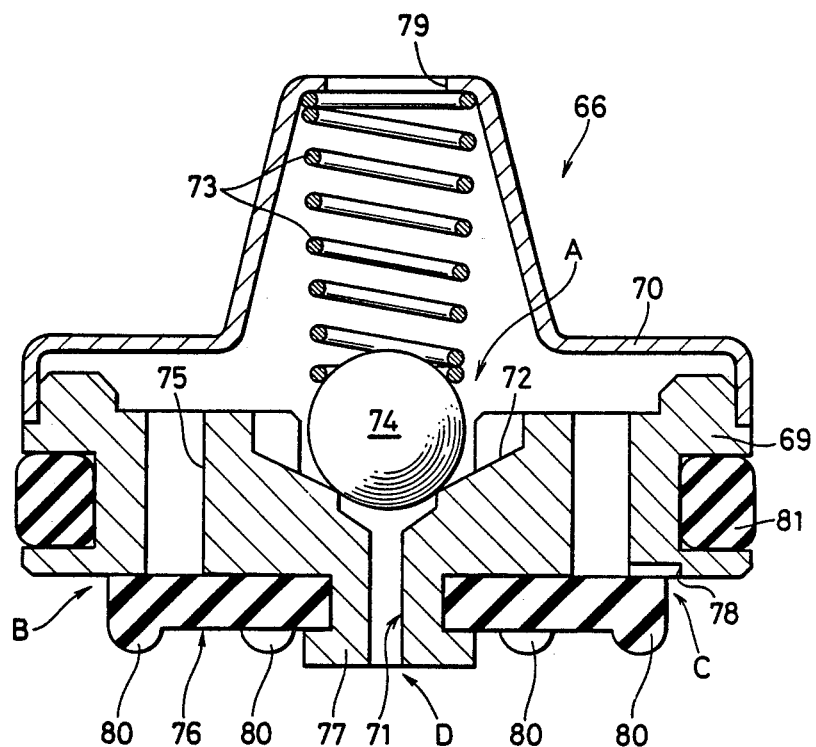
FIG. 3 is a cross-sectional view of a multiple valve apparatus in the booster of FIG. 2.

The detail of the multiple valve apparatus 66 is shown in FIG. 3. It includes a relief valve A, a check valve B and a restricting path C. When the oil pressure of the lower side becomes higher than a predetemined pressure, the relief valve A permits oil to flow only in the direction extending into the upper side from the lower side. The check valve B always permits oil to flow only in the direction extending into the lower side from the upper side. The restricting path C always makes the upper and lower sides communicate with each other, with restriction. The underside of the multiple valve apparatus 66 communicates through a bottom portion 65 of the hole 64 with the auxiliary hydraulic pressure chamber 41. The bottom portion 65 further communicates through a return aperture 52 with the main hydraulic pressure chamber 53 in the shown condition.

In the multiple valve apparatus 66, a main body 69 provided with a seal member 81 of rubber is fitted to the hole 64 of the boss 63. A cup-shaped spring receiver 70 is fixed to the main body 69. A valve seat 72 is formed in a central path 71 of the main body 69. A ball 74 as a valve member is urged to the valve seat 72 by a valve spring 73 which extends between the ball 74 and the bottom of the spring receiver 70. Plural vertical holes 75 are formed around the central path 71 in the main body 69. A disc-like valve member 76 of rubber is fitted to a downward projection 77 of the main body 69, so as to cover the lower ends of the holes 75. Plural round projectons 80 are formed in the lower surface of the valve member 76 in order to prevent the valve member 76 from closely contacting with the bottom surface of the boss 63. A small cutout 78 is formed in the lower surface of the main body 69, in communication with one of the vertical holes 75, and it extends laterally outside of the valve member 76. An opening 79 formed in the bottom portion of the cup-shaped spring receiver 70 communicates through the connecting member 67 (FIG. 2) with the oil reservoir 208 (FIG. 1). The relief valve A is constituted by the valve member 74, the valve spring 73, the central path 71 and the valve seat 72. The check valve B is constituted by the vertical holes 75 and the valve member 76. The restricting path C is constituted by the small cutout 78. The lower half of the central path 71 is reduced in cross section so as to form a restricting path D. The throttling effect of the restricting path D is lower than that of the restricting path C.

Next, the detail of the relay valve part 9 will be described with reference to FIG. 2.

The relay valve part 9 is disposed in the left end portion of the main portion 11 of the cylindrical casing 6 and the leftward projecting portion 8 thereof. The main body 85 provided with seal members 101 and 102 of rubber is tightly fitted to the left end portion of the main portion 11 of the casing 6, and it is fixed to the latter by a plurality of bolts 10.

A dome-shaped relay piston 87 provided with a seal ring 84 of rubber is slidably fitted to the projecting portion 8. A central projection 87a is formed in the relay piston 87, being concentric with a guide rod 99 fixed to the head of the screw 12. A guide hole is axially formed in the central projection 87a. The guide rod 99 is inserted into the guide hole so as to guide the relay piston 87. A first air chamber 88 as an input air chamber is formed by the projecting portion 8 of the casing 6 and the relay piston 87. A second air chamber b as an output air chamber is formed between the relay piston 87 and the main body 85. On the other hand, the main body 85 functions also as a part of a partitioning wall for the air pressure chamber 17 of the air cylinder part 2. A hole 86 is formed in the lower part of the main body 85. The second air chamber b and the air pressure chamber 17 always communicate with each other through the hole 86.

The relay piston 87 is urged leftwards by a spring 89. A valve-actuating disc 90 fixed to the top end of the central projection 87a of the relay piston 87 is aligned with a central hole of the main body 85. A discharge pipe 93 as a valve member is inserted into the central hole of the main body 85. A rightwardly directed annular valve seat 91 is formed at the left end of the central hole in the main body 85. A rubber ring 92 is attached to a flange formed on the left end of the discharge pipe 93 which is urged leftwards by a valve spring 94, and it seats on the valve seat 91 in the non-operated condition as shown in FIG. 2. An air supply-exhaust valve is constituted by the valve-actuating disc 90, the valve seat 91, the rubber ring 92, the discharge pipe 93 and the valve spring 94.

A partition ring 95 provided with seal rings of rubber in its inner and outer circumferences is fixed to the right end of the central hole of the main body 85. The discharge pipe 93 is slidably fitted into the partition ring 95. A compressed air chamber 96 is formed by the partition ring 95 and the main body 85 around the left end portion of the discharge pipe 93, and it always communicates through a radial hole 82 of the main body 85, the opening 15 of the casing 6 and the conduit 213a (FIG. 1) with the air reservoir tank 202a. Accordingly, compressed air is always supplied into the compressed air chamber 96.

The discharge pipe 93 is elongated rightwards across the air pressure chamber 17, and slidably fitted into an axial hole 25 of the connecting rod 24. Radial holes 26 are formed in communication with the axial hole 25 in the connecting rod 24. An inside hole 100 of the discharch pipe 93 communicates through the radial holes 26 with the atmospheric chamber 30 of the air cylinder part 2. The atmospheric chamber 30 communicates with the path 16 and discharge chamber 27. A check valve 83 of rubber is arranged in the discharge chamber 27, and it is supported by a valve seat plate 97 fixed to the flange portion 22 of the master cylinder body 7. Plural openings 98 are formed in the valve seat plate 97, and they are closed by the circumferential portion of the check valve 83 in the shown non-operated condition. The circumferential portion of the check valve 83 is sufficiently flexible. Next, there will be described operations of the booster 1.

When the driver treads the brake pedal 201a of the dual brake valve 201, compressed air is supplied as an input compressed air through the conduit 207a, the connecting member 13 and the opening 14 into the first air chamber 88 of the relay valve part 9. The relay piston 87 is moved rightwards. The valve-actuating disc 90 comes to contact with the valve rubber 92 attached to the top end of the discharge pipe 93. Thus, the opening of the discharge pipe 93 is closed by the valve-actuating disc 90 to cut the communication between the second air chamber and the atmospheric chamber 30. With further rightward movement of the relay piston 87, the discharge pipe 93 is pushed rightwards by the valve-actuating disc 90 and, the valve rubber 92 is separated from the valve seat 91. Thus, the compressed air chamber 96 is made to communicate through the second air chamber b and the path 86 with the air pressure chamber 17. Compressed air from the reservoir tank 202a is supplied as an output compressed air into the air pressure chamber 17. The power piston 18, and therefore the connecting rod 24 are moved forwards against the preload of the return spring 20.

With the rightward movement of the connecting rod 24, oil pressures in the auxiliary hydraulic pressure chamber 41 and the main hydraulic pressure chamber 53 start to rise. Pressurized oil from the auxiliary hydraulic pressure chamber 41 flows through the radial through hole 42, the inside hole 47 of the shank portion 46 of the valve member 45, the radial opening thereof and the opened valve device 44 into the main hydraulic pressure chamber 53. Since the oil pressure in the auxiliary hydraulic pressure chamber 41 rises sooner than the oil pressure in the main hydraulic pressure chamber 53 due to the larger diameter portion 36, the valve device 44 is opened by the oil pressure from the auxiliary hydraulic pressure chamber 41.

The volumes of the auxiliary pressure chamber 41 and main pressure chamber 53 decrease with the rightward movement of the connecting rod 24. Oil from the main pressure chamber 53 flows through the deformed valve rubber 58, the central outlet 54 of the plug member 55, and the conduit 210a (FIG. 1) into the wheel cylinders of the front wheels 211a and 211b. The flow amount of oil from the central outlet 54 towards the wheel cylinders of the front wheels 211a and 211b is nearly equal to the sum of the decreases of the volumes of the auxiliary pressure chamber 41 and main pressure chamber 53.

Although the moved length of the connecting rod 24 is small at the initial stage, the discharge amount of oil is relatively large, since the cross-section area of the larger diameter portion 36 of the connecting rod 24 is relatively large. The pressure rise of oil is relatively small, since the pressure is equal to the division of the movement force of the connecting rod 24 by the cross-section area of the larger diameter portion 36. Although the restricting path C is always open in the multiple valve apparatus 66, the flow amount of oil towards the oil reservoir 208 is negligibly small, since the throttling effect is sufficiently high.

When the oil pressure of the auxiliary pressure chamber 41 rises to the opening pressure of the relief valve A of the multiple valve apparatus 66, the pressurized oil starts to flow towards the oil reservoir from the auxiliary pressure chamber 41. Thus, the pressure rise of the auxiliary pressure chamber 41 is restricted to the opening pressure of the relief valve A. The oil pressure of the main pressure chamber 53 continues to rise with the forward movement of the connecting rod 24. The valve device 44 is closed. The relief valve A continues to be opened. The pressure rise rate of the main pressure chamber 53 is increased. Before the relief valve A is opened, the movement force of the connecting rod 24 is distributed to raise the oil pressure of the auxiliary pressure chamber 41 and that of the main pressure chamber 53. After the relief valve A is opened, the movement force of the connecting rod 24 is distributed to open the relief valve A and to rise the oil pressure of the main pressure chamber 53. Accordingly, the rate of the oil pressure rise of the main pressure chamber 53 is increased. Higher pressure is generated in the main pressure chamber 53.

When the oil pressure rises nearly to an aimed pressure, the movement of the connecting rod 24 almost stops. The decrease of the volume of the auxiliary pressure chamber 41 almost ends. The pressurized oil from the auxiliary pressure chamber 41 flows through the restricting path C towards the oil reservoir. The pressure of the auxiliary pressure chamber 41 is gradually lowered. At last, it becomes zero. Now, all of the movement force of the connecting rod 24 is used to rise the oil pressure of the main pressure chamber 53. The pressure of the main pressure chamber 53 becomes higher. At last, it reaches the aimed pressure. Thus, the front wheels 211a and 211b are braked at the aimed braking force.

When the driver releases the pedal 201a from the treaded position, the compressed air is exhausted from the first air chamber 88. The relay piston 87 is moved back leftwards to the original position by the spring 89. The valve-actuating disc 90 is separated from the discharge pipe 93. The valve rubber 92 comes to contact with the valve seat 91. The second air chamber b is made to communicate with the path 100. Thus, the compressed air flows out from the air pressure chamber 17 into the atmospheric chamber 30 through the path 86, the second pressure chamber b, the path 100 and the hole 26. Then, it deforms the check valve 83 and is discharged to the atmosphere. The power piston 18 and therefore the connecting rod 24 are rapidly moved back leftwards to the original positions by the spring force of the return spring 20 and the discharging compressed air.

With the rapid leftward movement of the connecting rod 24, negative pressures are generated in the auxiliary pressure chamber 41 and the main pressure chamber 53. The valve rubber 76 is deformed in the multiple valve apparatus 66. Brake oil flows from the oil reservoir side into the auxiliary pressure chamber 41. It opens the valve device 44, and flows from the auxiliary pressure chamber 41 into the main pressure chamber 53. Further, brake oil flows from the botton portion 65 of the hole 64 into the main pressure chamber 53 through the return aperture 52. Thus, the negative pressure is compensated in the chambers 41 and 53.

When the connecting rod 24 is moved leftwards almost to the original position, the pressure become lower in the chambers 41 and 53. The pressurized oil from the wheel cylinders of the front wheels 211a and 211b opens the residue pressure valve 61, and it returns into the main pressure chamber 53. Further, it flows through the return aperture 52 and the restricting path C of the multiple valve apparatus 66 into the oil reservoir 208. With the stop of the oil flow, operation of the booster 1 ends. The opening pressure of the residue pressure valve 61 which is determined by the spring force of the spring 60, is left in the wheel cylinders of the front wheels 211a and 211b.

When the conduit system breaks and oil leaks, or when the brake shoe of the wheel wears excessively, the power piston 18 is moved excessively rightwards in operation, so that it comes to contact with the actuating rod 29 of the stroke switch 28. The latter turns on to drive a not-shown alarm.

Next, a pneumatic-hydraulic booster according to another embodiment of this invention will be described with reference to FIG. 4. Parts in FIG. 4 which correspond to those in the embodiment of FIG. 2 are denoted by the same reference numerals, the detailed description of which will be omitted.

A pneumatic-hydraulic booster 200 according to this embodiment consists of an air cylinder part 2', a master cylinder part 3' and a relay valve part 9'. The construction of the master cylinder part 3' is almost equal to that of the master cylinder part 3 of the above first embodiment. The shape of the cylindrical casing 6' for containing the air cylinder part 2' and relay valve part 9' is different from the casing 6 of the first embodiment.

In the air cylinder part 2', a connecting rod 24' is solid in contrast to the connecting rod 24 of the first embodiment. A stroke detector S is disposed in the lower portion of the atmospheric chamber 30. It consists mainly of a first actuating rod 140, a second hollow actuating rod 137 into which the first actuacting rod 140 is inserted, and a switch 132 to be actuated by the second actuating rod 137. The first actuating rod 140 is urged leftwards by a spring 134 which extends between a lower portion of a flange portion 22' of a master cylinder body 7' and a spring receiver 136. It is slidably inserted through the spring receiver 136 which is stopped by a stopper 139 fixed to one end portion of the first actuating rod 140. One end of the first actuating rod 140 contacts with the lower end of the power piston 18. Another end thereof projects outward from the second actuating rod 137 which is slidably fitted to a stepped through hole made in the lower end portion of the flange portion 22' of the master cylinder body 7'. It consists of a first smaller diameter portion 137a, a larger diameter portion 137b and a second smaller diameter portion 137c. The first smaller diameter portion 137a is directed to the spring receiver 136, spaced from each other by a predetermined distance. A rubber cap 138 is fitted to the top of the second smaller diameter portion 137c. A movable actuator 133 of the switch 132 contacts with the left end of the second smaller diameter portion 137c. Or the former may be facing to the latter, spaced by a slight gap. A taper is formed between the larger diameter portion 137b and the second smaller diameter portion 137c.

Next, there will be described the detail of the relay valve part 9'.

A main valve body 104 provided with seal rings 101a, 101b and 101c of rubber is tightly fitted to the left end portion of the casing 6', and fixed thereto by plural bolts 10. It consists of a partition wall portion 104a and a cylindrical portion 104b. A relay piston 105 provided with seal rings 84a and 84b of rubber is slidably fitted into the cylindrical portion 104b of the main valve body 104. An axial projection 105a is formed in the center of the relay piston 105, being concentric with the main valve body 104. The relay piston 105 is urged leftwards by a spring 110, and contacts at its plural projections with the end surface of the cylindrical casing 6'. A first air chamber 106 is formed by the end surface of the casing 6' and the relay piston 105. It communicates through a cutout 103 of the cylindrical portion 104b of the valve main body 104 with the connecting member 13 which is connected through the conduit to the brake valve as in the first embodiment.

A second air chamber b is formed between the relay piston 105 and the partition wall portion 104a of the valve main body 104 which functions also as a partition wall for the air pressure chamber 17 of the air cylinder part 2'. An axial hole 86' is formed in the lower portion of the partition wall portion 104a, by which the second air chamber b is always made to communicate with the air pressure chamber 17. As shown by the chain lines, recesses 102 are made in the main valve body 104 to reduce the weight of the latter.

An axial hole 108 is formed in the axial projection 105a of the relay piston 105. Further, radial holes 107 are formed in the relay piston 105, communicating with the axial hole 108 at one side and communicating at another side through a radial hole 109 of the cylindrical portion 104b of the main valve body 104 with a discharge pipe 131 arranged above the casing 6', to be hereinafter described in detail.

The axial projection 105a of the relay piston 105 is aligned with a central hole of the partition wall portion 104a of the main body 104. A valve member 112 is inserted into the central hole. A rightwardly directed annular valve seat 91 is formed at the left end of the central hole. A rubber sheet 111 is attached to the left end of the valve member 112 which is urged leftwards by a valve spring 94, and it seats on the valve seat 91 in the shown non-operated condition as shown in FIG. 4. An air supply-exhaust valve is constituted by the axial projection 105a, the valve seat 91, the rubber sheet 111, the valve member 112 and the valve spring 94.

The partition ring 95 provided with seal rings of rubber in its inner and outer circumferences is fixed to the right end of the central hole of the main body 104. The valve member 112 is slidably fitted into the partition ring 95, and it is guided by axial guide ribs formed on the inner wall of the central hole. A compressed air chamber 96 is formed by the partition ring 95 and the partition wall portion 104a of the main body 104 around the valve member 112, and it always communicates through a radial hole 82 of the partition wall portion 104a of the main body 104, an opening 15 of the casing 6' and the conduit with the air reservoir tank, as in the first embodiment. Accordingly, compressed air is always supplied into the compressed air chamber 96.

Next, an exhaust contruction will be described.

Elbow-like rubber tubes 113 and 114 are fitted to both ends of the discharge pipe 131. One end of the one rubber tube 113 is fitted to the opening 129 made in the left and portion of the casing 6'. The opening 129 communicates with the axial hole 108 of the axial projection 105a of the relay valve 105 through the radial holes 107 and 109, as above described. One end of the other rubber tube 114 is fitted to an opening 130 made in the right end portion of the casing 6'. The opening 130 communicates with the atmospheric chamber 30.

The rubber tubes 113 and 114 function not only as connectors for connecting the discharge pipe 131 to the openings 129 and 130 of the casing 6', but also as check valves which can be opened by the compressed air into the discharge pipe 131, and normally close as shown. Portions 116 and 118 of the rubber tubes 113 and 114 fitted to the ends of the discharge pipe 131 are so thin that the rubber tubes 113 and 114 can function as check valves. The portions 116 and 118 are very flexible. Other portions 115 and 117 of the rubber tubes 113 and 114 are relatively thick.

Next, there will be described operations of the pneumatic-hydraulic booster 200.

When the driver treads the brake pedal of the dual brake valve, compressed air is supplied as an input compressed air through the conduit, the connecting member 13 and the opening 14 into the first air chamber 106. The relay piston 105 is moved rightwards. The axial projection 105a comes to contact with the valve rubber sheet 111 attached to the top end of the valve member 112. Thus, the opening of axial projection 105a is closed by the valve rubber sheet 111. With further rightward movement of the relay piston 105, the valve member 112 is pushed rightwards by the axial projection 105a and the valve rubber seat 111 is separated from the valve seat 91. Thus, the compressed air chamber 96 is made to communicate through the second air chamber b and the path 86' with the air pressure chamber 17. Compressed air from the reservoir tank is supplied as an output compressed air into the air pressure chamber 17. The power piston 18, and therefore the connecting rod 24' are moved forwards against the preload of the return spring 20.

Hereafter, the air cylinder part 2' and the master cylinder part 3' operate for braking the vehicle in the same manner as the air cylinder part 2 and the master cylinder parts 3 in the first embodiment.

When the driver releases the pedal from the treaded position, the compressed air is exhausted from the first air chamber 106. The relay piston 105 is moved leftwards to the original position by the spring 110. The axial projection 105a is separated from the valve rubber sheet 111. The valve rubber sheet 111 comes to contact with the valve seat 91. The second air chamber b is made to communicate with the axial hole 108. Thus, the compressed air flows out from the air pressure chamber 17 into the discharge pipe 130 through the axial hole 108, the radial holes 107 and 109. The thin portions 116 and 118 of the rubber tubes 113 and 114 are deformed in the radial direction by the compressed air which is discharged to the atmosphere through the gap between the thin portions 116 and 118 and the ends of the discharge pipe 131. A part of the compressed air from the air pressure chamber 17 is introduced into the atmospheric chamber 30 through the discharge pipe 131 and the other rubber tube 114 at the initial dischage stage. Accordingly, when the power piston 18 is moved leftwards, the pressure of the atmospheric chamber 30 is not reduced as much. The power piston 18 can be rapidly moved to the original position by the return spring 20 and the part of the compressed air introduced into the atmospheric chamber 30. Finally, all of the compressed air from the air pressure chamber 17 is discharged into the atmosphere through the opened rubber tubes 113 and 114.

Other operations of the air cylinder part 2' and master cylinder part 3' for releasing the brake of the vehicle are the same as those of the air cylinder part 2 and master cylinder part 3 in the first embodiment.

When the power piston 18 is moved forward, the first actuating rod 140 is pushed rightwards by the power piston 18. Accodingly, the first actuating rod 140 is projected outwards more from the second actuating rod 137 with the forward movement of the power piston 18. Although the power piston 18 cannot be seen from the outside, the driver can know by the projecting length of the first actuating rod 140 how much the power piston 18 is moved forwards. For example, in the air purge operation of the manufacturing process of the booster 200, it can be known by the projecting length of the first actuating rod 140 how much air is purged from the master cylinder part 3' and the conduit system connected to the part 3'.

When the conduit system breaks and oil leaks in use of the booster 200, or when the brake shoe of the wheel wears excessively, the power piston 18 is moved excessively rightwards in operation, so that the spring receiver 136 comes to contact with the second actuating rod 137, and pushes it forwards. The actuator 133 is pushed down by the taper between the second smaller diameter portion 137c and the larger diameter portion 137b of the second actuating rod 137. The switch 132 turns on to drive a not-shown alarm.

Figure 4:
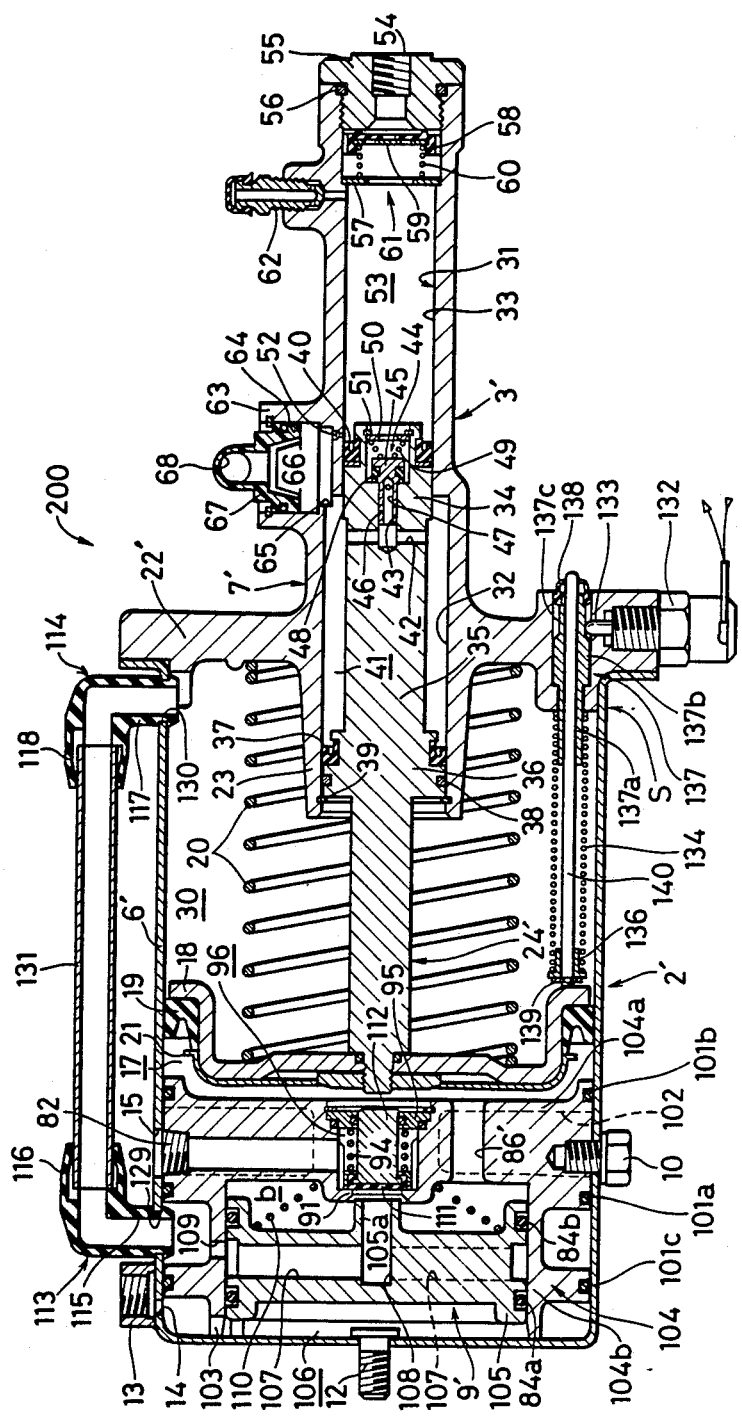
FIG. 4 is a cross-sectional view of a pneumatic-hydraulic booster according to another embodiment of this invention.
Figure 5:
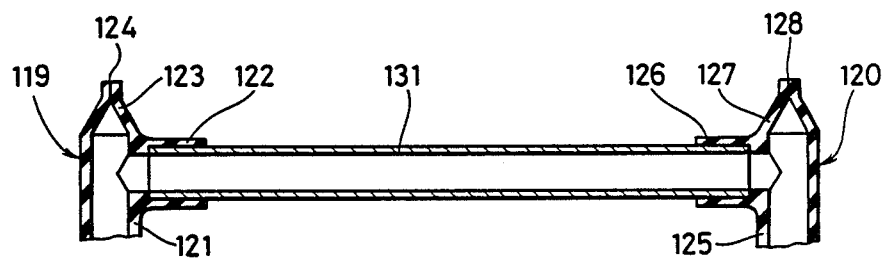
FIG. 5 is a cross-sectional view of one modification of an exhaust construction in the booster of FIG. 4.
Figure 6:
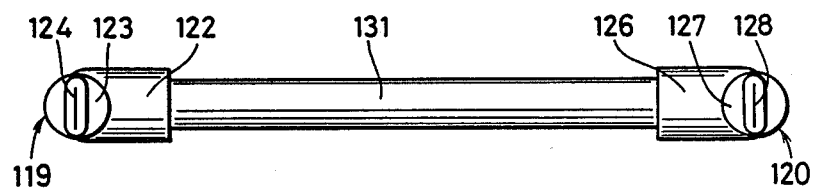
FIG. 6 is a plan view of the one modification of FIG. 5.

FIG. 5 and FIG. 6 show one modification of the exhaust contruction applied to the booster 200 of FIG. 4.

In this modification, rubber tubes 119 and 120 are generally T-shaped. They consist of vertical straight portions 121, 125, horizontal portions 122, 126, vertical cone portions 123, 127 and lip portions 124, 128 formed on the tops of the vertical cone portions 123, 127, respectively. The vertical straight portions 121, 125 are connected to the opening 129, 130 of the casing 6' in FIG. 4. The horizontal portions 122 and 126 are fitted to the ends of the discharge pipe 131. The lip portions 124 and 128 elastically close in the shown normal condition. When the compressed air is led into the discharge pipe 131, the lip portions 124 and 128 are opened, and permit the compressed air to be discharged into the atmosphere. The lip portions 124 and 128 are very flexible.

In comparison with the conventional pneumatic-hydraulic booster, the boosters according to the above embodiments of this invention have the following advantages:

A conduit for connecting a relay valve and a pneumatic-hydraulic booster is not necessary in the booster of this invention. Thus, the braking system can be simplified. The number of the necessary parts can be reduced. The assembling operation can be facilitated. Accordingly, the labor or manufacturing efficiency can be improved.

The booster 200 of FIG. 4 has the advantage over the booster 1 of FIG. 2.

In the booster of FIG. 2, the discharge pipe 93 as the valve member is inserted into the axial hole of the connecting rod 24. They should be so accurately aligned with each other that the relay valve part 9 can be operated in the proper manner. However, in the booster of FIG. 4, the valve member 112 is independent of the connecting rod 24'. Accordingly, the manufacture and assembling are more easy.

In the booster of FIG. 2, the relay piston 87 and the valve main body 85 should be concentric with the inner hole of the projecting portion 8 of the cylindrical casing 5, and the inner hole of the main portion 11 of the cylindrical casing 6, respectively. Further, the relay piston 87 should be so concentric with the valve main body 85 that the axial projection 87a of the relay piston 87 can face directly to the central hole of the valve main body 85.

In the booster of FIG. 4, although the valve main body 104 should be concentric with the inner hole of the casing 6', the relay piston 105 needs merely to be concentric with the valve main body 104. Accordingly, the centering is more easy in the booster of FIG. 4.

While the preferred embodiments have been described, variations thereto will occur to those skilled in the art within the scope of the present inventive connects which are delineated by the following claims.

For example, in the above embodiments, the connecting rod 24 or 24' as the output rod is inserted into the master cylinder part 3 or 3', and it functions also as a piston for the master cylinder part. However, the output rod may be a separate body from the piston for the master cylinder part. In this case, the former is combined with the latter through suitable means.

Further, in the above embodiments, the connecting rod 24 or 24' has the larger diameter portion 36 in the master cylinder part 3 or 3', and the auxiliary hydraulic pressure chamber 41 is formed between the larger diameter portion 36 and the top end portion 34. With such arrangement, the brake can be more rapidly applied to the wheels, since more brake oil is supplied to the wheel cylinders at the initial stage of the braking opertion, and necessary stroke of the connecting rod 24 or 24' for braking can be reduced.

This invention may be applied to a pneumatic-hydraulic booster which includes a usual master cylinder part without the auxiliary hydraulic pressure chamber 41. However, the booster including the shown master cylinder part with the auxiliary hydraulic pressure chamber 41 can be shorter, since necessary stroke is smaller.

Further, both of the rubber tubes 113 and 114 have the function of the check valve. Instead, only one of the rubber tubes 113 and 114 may have the function of the check valve. The other of the rubber tubes 113 and 114 may be uniform in thickness.

What is claimed is:

1. A pneumatic-hydraulic brake booster for a vehicle comprising:
   (A) a master cylinder part;
   (B) a pneumatic cylinder part combined with said master cylinder part, including a power piston slidably fitted to a cylindrical casing, and an output rod fixed to said power piston, extending to said master cylinder part;
   (C) a partition wall body fitted into and fixed to said cylindrical casing, and
   (D) a relay valve part being arranged at the opposite side of said partition wall body to said power piston in said cylindrical casing, for supplying compressed air into an air pressure chamber formed between said partition wall body and said power piston, and discharging the compressed air from said air pressure chamber formed at the opposite side of said power piston to said air pressure chamber in said cylindrical casing;

said relay valve part includes a relay piston, a valve member arranged in a central hole of said partition wall body and fitted air-tightly and slidably to said partition wall body, a valve seat formed at the end of said central hole in said partition wall body, and a valve spring for urging said valve member to said valve seat;

wherein, when compressed air is supplied into said air pressure chamber through said relay valve part upon the application of the brake, said power piston, and therefore said output rod are moved forwards to generate hydraulic pressure in said master cylinder part, and said hydraulic pressure is applied to a wheel cylinder, and upon relieving said brake, the compressed air is discharged into said atmospheric chamber from said air pressure chamber and said relay valve part.

2. A pneumatic-hydraulic brake booster according to claim 1, in which a central axial projection is formed in said relay piston, being facing to said valve member, and an axial guide rod fixed to said cylindrical casing is inserted into an axial hole made in said central axial projection.

3. A pneumatic-hydraulic brake according to claim 1, in which a stroke switch is facing to said power piston, and said switch and said power piston are spaced from each other by a predetermined length.

4. A pneumatic-hydraulic brake booster according to claim 1, in which a stroke detector faces said power piston, so as to detect the moved length of said power piston and alarm the driver of a moved length longer than a predetermined length.

5. A pneumatic-hydraulic brake booster according to claim 1, in which a residue pressure valve is arranged adjacent to the outlet to the wheel cylinder in said master cylinder part.

6. A pneumatic-hydraulic brake booster according to claim 1, in which said output rod is inserted into a master cylinder body of said master cylinder part, and functions as a hydraulic piston for said master cylinder part.

7. A pneumatic-hydraulic brake booster according to claim 6, in which said output rod has a top end portion slidably fitted to a smaller diameter portion of a stepped hole of said master cylinder body, and a larger diameter portion slidably fitted to a larger diameter portion of said stepped hole, an auxiliary hydraulic pressure chamber and a main hydraulic pressure chamber are formed at both sides of said top end portion, said auxiliary hydraulic pressure chamber being connected through a valve device with said main hydraulic pressure chamber, and a multiple valve apparatus consisting of a relief valve, a check valve and a restriction path are arranged between a brake oil reservoir and said auxiliary hydraulic pressure chamber.

8. A pneumatic-hydraulic brake booster according to claim 1, in which said valve member is elongated into an axial inner hole of said output rod, passing air-tightly and slidably through said partition wall body, and said valve member has an axial inner hole facing to said relay piston at one side and communicating at another side through a radial hole of said output rod with an atmospheric chamber formed at the opposite side of said power piston to said air pressure chamber in said cylindrical casing.

9. A pneumatic-hydraulic brake booster according to claim 8, in which a compressed air chamber is formed around said valve member in said central hole of the partition wall body, said compressed air chamber communicating through a radial hole made in said partition wall body and a first opening made in said cylindrical casing with an air reservoir, and compressed air being always supplied to said compressed air chamber from said air reservoir.

10. A pneumatic-hydraulic brake booster according to claim 9, in which two air chambers are formed at both sides of said relay piston, one of said two air chambers communicating through a second opening made in said cylindrical casing with a brake valve to be operated by the driver of the vehicle, and the other of said two air chamber communicating through an axial hole made in said partition wall body, with said air pressure chamber, and when said brake valve is trodden by the driver, compressed air is supplied as an input air into said one of the two air chambers to move said relay piston to said valve member, cut the communication between said other of the two air chambers and said atmospheric chamber and separate said valve member from said valve seat, and said compressed air chamber is made to communicate with said air pressure chamber to supply compressed air as an output air into said air pressure chamber.

11. A pneumatic-hydraulic brake booster according to claim 10, in which an exhaust check valve is arranged at a third opening made in said cylindrical casing, in communication with said atmospheric chamber and the atmosphere.

12. A pneumatic-hydraulic brake booster according to claim 1, in which said partition wall body includes a partition wall portion for partitioning said air pressure chamber and a cylindrical portion formed at the opposite side of said partition wall portion to said air pressure chamber, and said relay valve part includes a relay piston, a valve member arranged in a central hole of said partition wall portion, a valve seat formed at the end of said central hole in said partition wall portion, a valve spring for urging said valve member to said valve seat, said relay piston being slidably fitted to said cylindrical portion and facing to said valve member.

13. A pneumatic-hydraulic brake booster according to claim 12, in which said valve member is axially and slidably supported by said partition wall portion.

14. A pneumatic-hydraulic brake booster according to claim 13, in which a compressed air chamber is formed around said valve member in said central hole of the partition wall portion, said compressed air chamber communicating through a radial hole made in said partition wall portion and a first opening made in said cylindrical casing with an air reservoir, and compressed air being always supplied to said compressed air chamber from said air reservoir.

15. A pneumatic-hydraulic brake booster according to claim 14, in which two air chambers are formed at both sides of said relay piston, one of said two air chamber communicating through a second opening made in said cylindrical casing with a brake valve to be operated by the driver of the vehicle, and the other of said two air chambers always communicating through an axial hole made in said partition wall portion, with said air pressure chamber, and when said relay piston is separated from said valve member in the original position, said other of the two air chambers communicates through axial and radial holes made in said relay piston, a radial hole made in said cylindrical portion of the partition wall body, and a third opening made in said cylindrical casing with the atmosphere, and when said brake valve is trodden by the driver, compressed air is supplied as an input air into said one of the two air chambers to move said relay piston to said valve member, cut the communication between said other air chamber and the atmosphere, and separate said valve member from said valve seat, and said compressed air chamber is made to communicate with said air pressure chamber to supply compressed air as an output air into said air pressure chamber.

16. A pneumatic-hydraulic brake booster according to claim 15, in which an exhaust check valve is arranged at said third opening made in said cylindrical casing.

17. A pneumatic-hydraulic brake booster according to claim 15, in which a fourth opening is made in said cylindrical casing, in communication with an atmospheric chamber formed at the opposite side of said power piston to said air pressure chamber in said cylindrical casing, a pipe is connected between said third and fourth openings of the cylindrical casing, and at least one end of said pipe is connected through an exhaust check valve to the one of said third and fourth openings of the cylindrical casing.

18. A pneumatic-hydraulic brake booster according to claim 17, in which said exhaust check valve is made of flexible material, and elbow-like, the portion of said exhaust check valve fitted to the end of said pipe being so thinned as to be easily deformable in the radial direction by the compressed air into said pipe.

19. A pneumatic-hydraulic brake booster according to claim 17, in which said exhaust check valve is made of flexible material and T-shaped, one arm portion of said exhaust check valve being fitted to the end of said pipe, another arm portion thereof being fitted to the one of said third and fourth openings of the cylindrical casing, and the rest arm portion having a lip at the top end, said lip being able to open by the compressed air into said pipe.

* * * * *